(12) United States Patent
Chen et al.

(10) Patent No.: US 10,008,955 B2
(45) Date of Patent: Jun. 26, 2018

(54) RESONANT CONVERTER AND SYNCHRONOUS RECTIFICATION CONVERTER CIRCUIT THEREOF

(71) Applicant: HUAWEI TECHNOLOGIES CO., LTD., Shenzhen, Guangdong (CN)

(72) Inventors: Wenbin Chen, Shenzhen (CN); Kui Zhou, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days. days.

(21) Appl. No.: 15/460,534

(22) Filed: Mar. 16, 2017

(65) Prior Publication Data
US 2017/0187302 A1   Jun. 29, 2017

Related U.S. Application Data

(63) Continuation of application No. 14/924,989, filed on Oct. 28, 2015, now Pat. No. 9,780,687, which is a
(Continued)

(30) Foreign Application Priority Data

Apr. 16, 2014 (CN) .......................... 2014 1 0151324

(51) Int. Cl.
*H02M 7/757* (2006.01)
*H02M 7/06* (2006.01)
(Continued)

(52) U.S. Cl.
CPC ......... *H02M 7/06* (2013.01); *H02M 3/33592* (2013.01); *H02M 2007/2195* (2013.01);
(Continued)

(58) Field of Classification Search
CPC ..... H02M 7/757; H02M 7/06; H02M 3/33592
(Continued)

(56) References Cited

U.S. PATENT DOCUMENTS

| 4,769,754 A | 9/1988 | Reynolds et al. |
| 5,291,383 A | 3/1994 | Oughton |

(Continued)

FOREIGN PATENT DOCUMENTS

| CN | 101997413 A | 3/2011 |
| CN | 102170240 A | 8/2011 |

(Continued)

*Primary Examiner* — Adolf Berhane
*Assistant Examiner* — Nusrat Quddus
(74) *Attorney, Agent, or Firm* — Gregg L. Jansen

(57) ABSTRACT

A synchronous rectification converter circuit is provided, including three transformer secondary-windings, three current transformers, a synchronous rectification switching circuit, a diode rectification circuit, and a control circuit. Each of three current transformers includes a primary-winding and secondary-winding. The three transformer secondary-windings and the three current transformer primary-windings are alternately connected in series to form a first triangular structure circuit. Three vertices of the first triangular structure circuit are connected to the synchronous rectification switching circuit. The three current transformer secondary-windings are connected in series to form a second triangular structure circuit. Three vertices of the second triangular structure circuit are connected to the diode rectification circuit. The diode rectification circuit is connected to the control circuit and the synchronous rectification switching circuit is connected to the control circuit.

13 Claims, 4 Drawing Sheets

Related U.S. Application Data continuation of application No. PCT/CN2014/092143, filed on Nov. 25, 2014.

(51) Int. Cl.
  *H02M 3/335* (2006.01)
  *H02M 7/219* (2006.01)

(52) U.S. Cl.
  CPC ....... *Y02B 70/1408* (2013.01); *Y02B 70/1433* (2013.01); *Y02B 70/1441* (2013.01); *Y02B 70/1475* (2013.01); *Y02P 80/112* (2015.11)

(58) Field of Classification Search
  USPC ...... 363/15, 17, 21.02–21.18, 22–27, 44–48, 363/52–53, 81, 82, 84, 123, 125–127
  See application file for complete search history.

(56) References Cited

U.S. PATENT DOCUMENTS

| | | | |
|---|---|---|---|
| 5,410,467 A | 4/1995 | Smith et al. | |
| 5,770,911 A | 6/1998 | Cheng | |
| 6,597,587 B1* | 7/2003 | Poon | H02M 3/33592 363/125 |
| 7,558,083 B2 | 7/2009 | Schlecht | |
| 7,564,702 B2 | 7/2009 | Schlecht | |
| 7,768,800 B2* | 8/2010 | Mazumder | H02M 5/458 363/17 |
| 8,035,996 B1* | 10/2011 | Greenfeld | H02M 3/3376 363/132 |
| 8,976,542 B2* | 3/2015 | Richardson | H01J 1/135 219/715 |
| 9,148,933 B2 | 9/2015 | Ge | |
| 9,203,318 B2 | 12/2015 | Scibilia | |
| 2002/0021577 A1 | 2/2002 | Lau | |
| 2008/0037293 A1 | 2/2008 | Jacques et al. | |
| 2009/0097280 A1 | 4/2009 | Wu et al. | |
| 2009/0207637 A1 | 8/2009 | Boeke | |
| 2011/0149608 A1 | 6/2011 | Halberstadt | |
| 2012/0218793 A1 | 8/2012 | Springett et al. | |
| 2013/0201725 A1 | 8/2013 | Boysen et al. | |
| 2014/0112028 A1* | 4/2014 | Fahlenkamp | G01R 22/06 363/21.12 |
| 2014/0112030 A1* | 4/2014 | Fahlenkamp | H02M 3/33507 363/21.14 |
| 2014/0192560 A1 | 7/2014 | Ou et al. | |
| 2015/0109838 A1 | 4/2015 | Chen et al. | |
| 2015/0180350 A1 | 6/2015 | Huang et al. | |
| 2015/0263628 A1 | 9/2015 | Russell et al. | |
| 2015/0263640 A1 | 9/2015 | Russell et al. | |
| 2015/0381061 A1* | 12/2015 | Yan | H02M 3/33546 363/21.02 |
| 2017/0187302 A1 | 6/2017 | Chen et al. | |

FOREIGN PATENT DOCUMENTS

| | | |
|---|---|---|
| CN | 102255513 A | 11/2011 |
| CN | 102570833 A | 7/2012 |
| CN | 103475195 A | 12/2013 |
| CN | 103683964 A | 3/2014 |
| CN | 103701305 A | 4/2014 |
| CN | 105099230 A | 11/2015 |
| WO | 2013050619 A1 | 4/2013 |

\* cited by examiner

RESONANT CONVERTER AND SYNCHRONOUS RECTIFICATION CONVERTER CIRCUIT THEREOF

CROSS-REFERENCE TO RELATED APPLICATIONS

This application is a continuation of U.S. patent application Ser. No. 14/924,989, filed on Oct. 28, 2015, now allowed, which is a continuation of International Application No. PCT/CN2014/092143, filed on Nov. 25, 2014. The International Application claims priority to Chinese Patent Application No. 201410151324.5, filed on Apr. 16, 2014. All of the afore-mentioned patent applications are hereby incorporated by reference in their entireties.

TECHNICAL FIELD

The present invention relates to the communications field, and in particular, to a resonant converter and a synchronous rectification converter circuit of the resonant converter.

BACKGROUND

As electronic and electric technologies develop rapidly, high power, high efficiency, and high power density have become a development trend of a switching power supply. As one type of the switching power supply, a resonant converter is widely applied in the industry due to advantages such as high efficiency and high power density. The resonant converter has a synchronous rectification circuit, to enhance output efficiency of the resonant converter. Currently, control on the on-off state of the synchronous rectification circuit refers to a controller that samples voltages at two ends of each rectification switch component in the synchronous rectification circuit and controls the on-off state of each switch component according to a result of sampling. Because each switch component has inductance, a result of voltage sampling is incorrect, so that the on-off state of each rectification switch component cannot be precisely controlled.

SUMMARY

A resonant converter and a synchronous rectification converter circuit of the resonant converter are provided, to achieve a purpose of precisely controlling the on-off state of a synchronous rectification diode.

According to a first aspect, a synchronous rectification converter circuit is provided, and is applied to a resonant converter and configured to control a synchronous rectification circuit in the resonant converter, where the synchronous rectification circuit includes a first to a third groups of switch components; the first to the third groups of switch components are connected in parallel; and each group of switch components includes two switch components and a first node between the two switch components, where the synchronous rectification converter circuit includes:

a transformer secondary inductor group, where the transformer secondary inductor group includes a first transformer secondary inductor, a second transformer secondary inductor, and a third transformer secondary inductor;

a current transformer, where the current transformer includes a first primary inductor, a second primary inductor, a third primary inductor, a first secondary inductor, a second secondary inductor, and a third secondary inductor, where the first to the third primary inductors and the first to the third transformer secondary inductors are alternately connected head-to-tail in series to form a first triangular structure; the first triangular structure includes three edges and three first vertices; the first primary inductor is connected in series to the first transformer secondary inductor on the first edge; the second primary inductor is connected in series to the second transformer secondary inductor on the second edge; the third primary inductor is connected in series to the third transformer secondary inductor on the third edge; the three first vertices are respectively connected to the three nodes in the first to the third groups of switch components; the first to the third secondary inductors are connected head-to-tail in series to form a second triangular structure; the second triangular structure includes three edges and three second vertices; the first secondary inductor is on the first edge; the second secondary inductor is on the second edge; and the third secondary inductor is on the third edge; and a control unit, where the control unit includes a controller, a resistor, and a first to a third groups of diodes, where the first to the third groups of diodes are connected in parallel at two ends of the resistor; each group of diodes includes two diodes and a second node between the two diodes; the two diodes in each group of diodes are connected in series; the three second nodes of the first to the third groups of diodes are respectively connected to the three second vertices, and an end that is connected to a corresponding second node and of each secondary inductor has a same polarity as an end that is connected to a corresponding first node and of a corresponding transformer secondary inductor; the controller is separately connected to the switch components in the first to the third groups of switch components; and the controller is separately connected to the first to the third groups of diodes, acquires a sampling result by sampling voltages at two ends of each of the diodes, and controls the on-off state of corresponding switch components according to the sampling result.

With reference to the first aspect, in a first possible implementation manner of the first aspect, the controller is specifically configured to: when the diodes are conducted, control the switch components corresponding to the conducted diodes to be switched on, and when the diodes are cut off, control the switch components corresponding to the cut-off diodes to be switched off.

With reference to the first aspect or the first possible implementation manner of the first aspect, in a second possible implementation manner of the first aspect, a dotted terminal of the first transformer secondary inductor is connected to a dotted terminal of the first primary inductor; an undotted terminal of the first transformer secondary inductor is connected to an undotted terminal of the second primary inductor; and the undotted terminal of the first transformer secondary inductor is further connected to the first node of the second group of switch components;

a dotted terminal of the second transformer secondary inductor is connected to a dotted terminal of the second primary inductor; an undotted terminal of the second transformer secondary inductor is connected to an undotted terminal of the third primary inductor; and the undotted terminal of the second transformer secondary inductor is further connected to the first node of the third group of switch components;

a dotted terminal of the third transformer secondary inductor is connected to a dotted terminal of the third primary inductor; an undotted terminal of the third transformer secondary inductor is connected to an undotted terminal of the first primary inductor; and the undotted terminal of the third transformer secondary inductor is further connected to the first node of the first group of switch components;

a dotted terminal of the first secondary inductor is connected to an undotted terminal of the third secondary inductor; the dotted terminal of the first secondary inductor is further connected to the second node of the first group of diodes; an undotted terminal of the first secondary inductor is connected to a dotted terminal of the second secondary inductor; and the undotted terminal of the first secondary inductor is further connected to the second node of the second group of diodes; and an undotted terminal of the second secondary inductor is connected to a dotted terminal of the third secondary inductor; and the undotted terminal of the second secondary inductor is further connected to the second node of the third group of diodes.

With reference to the first aspect or the first or the second possible implementation manner of the first aspect, in a third possible implementation manner of the first aspect, the first group of diodes includes a first diode and a second diode; the second group of diodes includes a third diode and a fourth diode; the third group of diodes includes a fifth diode and a sixth diode; a positive electrode of the first diode is connected to a negative electrode of the second diode; the positive electrode of the first diode is further connected to the dotted terminal of the first secondary inductor; a negative electrode of the first diode is connected to a first end of the resistor; a positive electrode of the second diode is connected to a second end of the resistor; a positive electrode of the third diode is connected to a negative electrode of the fourth diode; the positive electrode of the third diode is further connected to the dotted terminal of the second secondary inductor; a negative electrode of the third diode is connected to the first end of the resistor; a positive electrode of the fourth diode is connected to the second end of the resistor; a positive electrode of the fifth diode is connected to a negative electrode of the sixth diode; the positive electrode of the fifth diode is further connected to the dotted terminal of the third secondary inductor; a negative electrode of the fifth diode is connected to the first end of the resistor; and a positive electrode of the sixth diode is connected to the second end of the resistor.

With reference to the third possible implementation manner of the first aspect, in a fourth possible implementation manner of the first aspect, the controller includes a control module and a first to a sixth comparing modules; the first to the sixth comparing modules respectively correspond to the first to the sixth diodes; two input ends of the first to the sixth comparing modules are respectively connected to a positive electrode and a negative electrode of a corresponding diode, and the first to the six comparing modules are configured to compare sampled voltages of the positive electrode and the negative electrode of the corresponding diode; an output end of the first to the sixth comparing modules is connected to the control module, to output a comparison result to the control module; and the control module is connected to each switch component in the first to the third groups of switch components and determines the on-off state of the corresponding diode according to the comparison result, to control the on-off state of switch components corresponding to the corresponding diode.

With reference to the first aspect or any one of the first to the fourth possible implementation manners of the first aspect, in a fifth possible implementation manner of the first aspect, the synchronous rectification converter circuit further includes a filter capacitor, where the filter capacitor is connected between the first end and the second end of the resistor.

According to a second aspect, a resonant converter is provided, and includes a synchronous rectification circuit and a synchronous rectification converter circuit that is configured to control the synchronous rectification circuit, where the synchronous rectification circuit includes a first to a third groups of switch components; the first to the third groups of switch components are connected in parallel; and each group of switch components includes two switch components and a first node between the two switch components, where the synchronous rectification converter circuit includes:

a transformer secondary inductor group, where the transformer secondary inductor group includes a first transformer secondary inductor, a second transformer secondary inductor, and a third transformer secondary inductor;

a current transformer, where the current transformer includes a first primary inductor, a second primary inductor, a third primary inductor, a first secondary inductor, a second secondary inductor, and a third secondary inductor, where the first to the third primary inductors and the first to the third transformer secondary inductors are alternately connected head-to-tail in series to form a first triangular structure; the first triangular structure includes three edges and three first vertices; the first primary inductor is connected in series to the first transformer secondary inductor on the first edge; the second primary inductor is connected in series to the second transformer secondary inductor on the second edge; the third primary inductor is connected in series to the third transformer secondary inductor on the third edge; the three first vertices are respectively connected to the three nodes in the first to the third groups of switch components; the first to the third secondary inductors are connected head-to-tail in series to form a second triangular structure; the second triangular structure includes three edges and three second vertices; the first secondary inductor is on the first edge; the second secondary inductor is on the second edge; and the third secondary inductor is on the third edge; and a control unit, where the control unit includes a controller, a resistor, and a first to a third groups of diodes, where the first to the third groups of diodes are connected in parallel at two ends of the resistor; each group of diodes includes two diodes and a second node between the two diodes; the two diodes in each group of diodes are connected in series; the three second nodes of the first to the third groups of diodes are respectively connected to the three second vertices, and an end that is connected to a corresponding second node and of each secondary inductor has a same polarity as an end that is connected to a corresponding first node and of a corresponding transformer secondary inductor; the controller is separately connected to the switch components in the first to the third groups of switch components; and the controller is separately connected to the first to the third groups of diodes, acquires a sampling result by sampling voltages at two ends of each of the diodes, and controls the on-off state of corresponding switch components according to the sampling result.

With reference to the second aspect, in a first possible implementation manner of the second aspect, the controller is specifically configured to: when the diodes are conducted, control the switch components corresponding to the conducted diodes to be switched on, and when the diodes are cut off, control the switch components corresponding to the cut-off diodes to be switched off.

With reference to the second aspect or the first possible implementation manner of the second aspect, in a second possible implementation manner of the second aspect, a dotted terminal of the first transformer secondary inductor is connected to a dotted terminal of the first primary inductor; an undotted terminal of the first transformer secondary inductor is connected to an undotted terminal of the second primary inductor; and the undotted terminal of the first transformer secondary inductor is further connected to a node of the second group of switch components;

a dotted terminal of the second transformer secondary inductor is connected to a dotted terminal of the second primary inductor; an undotted terminal of the second transformer secondary inductor is connected to an undotted terminal of the third primary inductor; and the undotted terminal of the second transformer secondary inductor is further connected to a node of the third group of switch components;

a dotted terminal of the third transformer secondary inductor is connected to a dotted terminal of the third primary inductor; an undotted terminal of the third transformer secondary inductor is connected to an undotted terminal of the first primary inductor; and the undotted terminal of the third transformer secondary inductor is further connected to a node of the first group of switch components;

a dotted terminal of the first secondary inductor is connected to an undotted terminal of the third secondary inductor; the dotted terminal of the first secondary inductor is further connected to a node of the first group of diodes; an undotted terminal of the first secondary inductor is connected to a dotted terminal of the second secondary inductor; and the undotted terminal of the first secondary inductor is further connected to a node of the second group of diodes; and an undotted terminal of the second secondary inductor is connected to a dotted terminal of the third secondary inductor; and the undotted terminal of the second secondary inductor is further connected to a node of the third group of diodes.

With reference to the second aspect or the first or the second possible implementation manner of the second aspect, in a third possible implementation manner of the second aspect, the first group of diodes includes a first diode and a second diode; the second group of diodes includes a third diode and a fourth diode; the third group of diodes includes a fifth diode and a sixth diode; a positive electrode of the first diode is connected to a negative electrode of the second diode; the positive electrode of the first diode is further connected to the dotted terminal of the first secondary inductor; a negative electrode of the first diode is connected to a first end of the resistor; a positive electrode of the second diode is connected to a second end of the resistor; a positive electrode of the third diode is connected to a negative electrode of the fourth diode; the positive electrode of the third diode is further connected to the dotted terminal of the second secondary inductor; a negative electrode of the third diode is connected to the first end of the resistor; a positive electrode of the fourth diode is connected to the second end of the resistor; a positive electrode of the fifth diode is connected to a negative electrode of the sixth diode; the positive electrode of the fifth diode is further connected to the dotted terminal of the third secondary inductor; a negative electrode of the fifth diode is connected to the first end of the resistor; and a positive electrode of the sixth diode is connected to the second end of the resistor.

With reference to the third possible implementation manner of the second aspect, in a fourth possible implementation manner, the controller includes a control module and a first to a sixth comparing modules; the first to the sixth comparing modules respectively correspond to the first to the sixth diodes; two input ends of the first to the sixth comparing modules are respectively connected to a positive electrode and a negative electrode of a corresponding diode; the first to the sixth comparing modules are configured to compare sampled voltages of the positive electrode and the negative electrode of the corresponding diode; an output end of the first to the sixth comparing modules is connected to the control module, to output a comparison result to the control module; and the control module is connected to each switch component in the first to the third groups of switch components and determines the on-off state of the corresponding diode according to the comparison result, to control the on-off state of switch components corresponding to the corresponding diode.

With reference to the second aspect or any one of the first to the fourth possible implementation manners of the second aspect, in a fifth possible implementation manner of the second aspect, the synchronous rectification converter circuit further includes a filter capacitor, where the filter capacitor is connected between the first end and the second end of the resistor.

With reference to the fifth implementation manner of the second aspect, in a sixth possible implementation manner of the second aspect, the resonant converter further includes a resonant circuit; the resonant circuit includes a transformer primary inductor group and a resonant element connected to the transformer primary inductor group; and the transformer primary inductor group is configured to receive an alternating voltage signal, and transform and couple the alternating voltage signal into the transformer secondary inductor group, where the transformer primary inductor group includes a first transformer primary inductor, a second transformer primary inductor, and a third transformer primary inductor, and the first to the third transformer primary inductors are connected head-to-tail to form a third triangular structure, to connect to the resonant element, where the third triangular structure includes three edges and three third vertices; the first transformer primary inductor is on the first edge; the second transformer primary inductor is on the second edge; the third transformer primary inductor is on the third edge; and the three third vertices are connected to the resonant element.

According to the synchronous rectification converter circuit provided in various implementation manners, an end that is connected to a corresponding second node and of each secondary inductor has a same polarity as an end that is connected to a corresponding first node and of a corresponding transformer secondary inductor; therefore, when a current flows through the transformer secondary inductor and the secondary inductor, a direction at which the current flows from the transformer secondary inductor to a corresponding switch component is the same as a direction at which the current flows from the corresponding secondary inductor to a corresponding diode. Therefore, the on-off state of the diode is synchronous with the on-off state of the corresponding switch component. Therefore, a controller can directly control the on-off state of the corresponding switch component according to the on-off state of the diode. The synchronous rectification converter circuit achieves a purpose of precisely controlling the on-off state of the synchronous rectification circuit.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
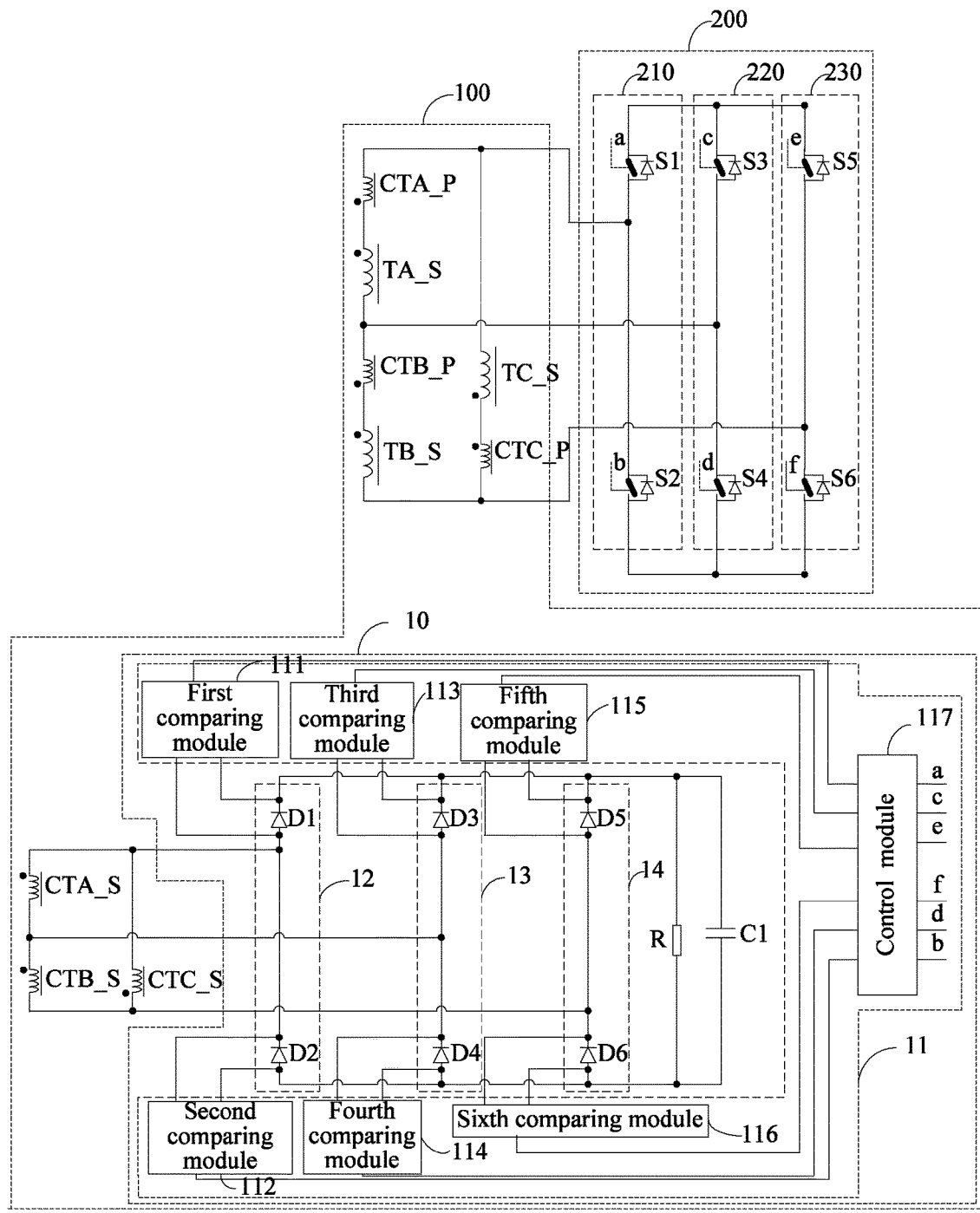
FIG. 1 is a circuit diagram of a synchronous rectification converter circuit connected to a synchronous rectification circuit according to an embodiment of a first solution of the present invention.

Referring to FIG. 1, an embodiment of a first solution of the present invention provides a synchronous rectification converter circuit 100, which is applied to a resonant converter and configured to control a synchronous rectification circuit 200 in the resonant converter. The synchronous rectification circuit 200 includes a first to third groups 210-230 of switch components. The first to third groups 210-230 of switch components are connected in parallel. Each group of switch components includes two switch components and a first node between the two switch components.

The synchronous rectification converter circuit 100 includes a transformer secondary inductor group, a current transformer, and a control unit 10.

The transformer secondary inductor group includes a first transformer secondary inductor TA-S, a second transformer secondary inductor TB-S, and a third transformer secondary inductor TC-S.

The current transformer includes a first primary inductor CTA-P, a second primary inductor CTB-P, a third primary inductor CTC-P, a first secondary inductor CTA-S, a second secondary inductor CTB-S, and a third secondary inductor CTC-S. The first to the third primary inductors CTA-P, CTB-P, and CTC-P and the first to the third transformer secondary inductors TA-S, TB-S, and TC-S are alternately connected head-to-tail in series (that is, the first transformer secondary inductor TA-S, the first primary inductor CTA-P, the second transformer secondary inductor TB-S, the second primary inductor CTB-P, the third transformer secondary inductor TC-S, and the third primary inductor CTC-P are sequentially connected head-to-tail in series) to form a first triangular structure. The first triangular structure includes three edges and three first vertices. The first primary inductor CTA-P is connected in series to the first transformer secondary inductor TA-S on the first edge, the second primary inductor CTB-P is connected in series to the second transformer secondary inductor TB-S on the second edge, and the third primary inductor CTC-P is connected in series to the third transformer secondary inductor TC-S on the third edge. The three first vertices are respectively connected to the three first nodes in the first to the third groups 210-230 of switch components. The first to the third secondary inductors CTA-S, CTB-S, and CTC-S are connected head-to-tail in series to form a second triangular structure. The second triangular structure includes three edges and three second vertices. The first secondary inductor CTA-S is on the first edge, the second secondary inductor CTB-S is on the second edge, and the third secondary inductor CTC-S is on the third edge.

The control unit 10 includes a controller 11, a first group 12 of diodes, a second group 13 of diodes, a third group 14 of diodes, and a resistor R. The first to the third groups of diodes are connected in parallel at two ends of the resistor R, and each group of diodes includes two diodes and a second node between the two diodes. The two diodes in each group of diodes are connected in series between a first end and a second end of the resistor R. The three second nodes of the first to the third groups 12-14 of diodes are respectively connected to the three second vertices. In addition, an end that is connected to a corresponding second node and of each secondary inductor has a same polarity as an end that is connected to a corresponding first node and of a corresponding transformer secondary inductor. The controller 11 is connected to the switch components in the first to the third groups 210-230 of switch components. The controller 11 is further connected to each diode of the first to the third groups 12-14 of diodes to sample voltages at two ends of the diode, acquire a sampling result, and control the on-off state of a corresponding switch component according to the sampling result.

Specifically, the first group 210 of switch components includes a first switch component S1 and a second switch component S2, the second group 220 of switch components includes a third switch component S3 and a fourth switch component S4, and the third group 230 of switch components includes a fifth switch component S5 and a sixth switch component S6. The first and the second switch components S1 and S2 are connected in series, the third and the fourth switch components S3 and S4 are connected in series, and the fifth and the sixth switch components S5 and S6 are connected in series.

The first group 12 of diodes includes a first diode D1 and a second diode D2, the second group 13 of diodes includes a third diode D3 and a fourth diode D4, and the third group 14 of diodes includes a fifth diode D5 and a sixth diode D6. The first diode D1 and the second diode D2, the third diode D3 and the fourth diode D4, and the fifth diode D5 and the sixth diode D6 are separately connected in series between the first end and the second end of the resistor R.

It should be noted that, the controller 11 is further configured to: when it is determined according to the sampling result that a diode is connected, control a switch component corresponding to the connected diode to be switched on. The controller 11 is further configured to: when it is determined according to the sampling result that the diode is cut off, control the switch component corresponding to the cut-off diode to be switched off. An end that is connected to a corresponding second node and of each secondary inductor has a same polarity as an end that is connected to a corresponding first node and of a corresponding transformer secondary inductor, to ensure that the on-off state of a diode corresponding to the secondary inductor is synchronous with the on-off state of a switch component corresponding to the transformer secondary inductor, so that the controller can control the on-off state of the corresponding switch component according to the on-off state of the diode.

A dotted terminal of the first transformer secondary inductor TA-S is connected to a dotted terminal of the first primary inductor CTA-P. An undotted terminal of the first transformer secondary inductor TA-S is connected to an undotted terminal of the second primary inductor CTB-P. The undotted terminal of the first transformer secondary inductor TA-S is further connected to a node of the second group 220 of switch components. A dotted terminal of the second transformer secondary inductor TB-S is connected to a dotted terminal of the second primary inductor CTB-P. An undotted terminal of the second transformer secondary inductor TB-S is connected to an undotted terminal of the third primary inductor CTC-P. The undotted terminal of the second transformer secondary inductor TB-S is further connected to a node of the third group 230 of switch components. A dotted terminal of the third transformer secondary inductor TC-S is connected to a dotted terminal of the third primary inductor CTC-P, and an undotted terminal of the third transformer secondary inductor TC-S is connected to an undotted terminal of the first primary inductor CTA-P. The undotted terminal of the third transformer secondary inductor TC-S is further connected to a node of the first group 210 of switch components. A dotted terminal of the first secondary inductor CTA-S is connected to an undotted terminal of the third secondary inductor CTC-S. The dotted terminal of the first secondary inductor CTA-S is further connected to a node of the first group 12 of diodes. An undotted terminal of the first secondary inductor CTA-S is connected to a dotted terminal of the second secondary inductor CTB-S. The undotted terminal of the first secondary inductor CTA-S is further connected to a node of the second group 13 of diodes. An undotted terminal of the second secondary inductor CTB-S is connected to a dotted terminal of the third secondary inductor CTC-S. The undotted terminal of the second secondary inductor CTB-S is further connected to a node of the third group 14 of diodes.

A positive electrode of the first diode D1 is connected to the second node of the first group 12 of diodes. A negative electrode of the first diode D1 is connected to the first end of the resistor R. A positive electrode of the second diode D2 is connected to the second end of the resistor R. A negative electrode of the second diode D2 is connected to the second node of the first group 12 of diodes. A positive electrode of the third diode D3 is connected to the second node of the second group 13 of diodes. A negative electrode of the third diode D3 is connected to the first end of the resistor R. A positive electrode of the fourth diode D4 is connected to the second end of the resistor R. A negative electrode of the fourth diode D4 is connected to the second node of the second group 13 of diodes. A positive electrode of the fifth diode D5 is connected to the second node of the third group 14 of diodes. A negative electrode of the fifth diode D5 is connected to the first end of the resistor R. A positive electrode of the sixth diode D6 is connected to the second end of the resistor R. A negative electrode of the sixth diode D6 is connected to the second node of the third group 14 of diodes.

It should be noted that, each group of inductors includes one primary inductor and one transformer secondary inductor. A dotted terminal of the transformer secondary inductor in each group of inductors is connected to a dotted terminal of the corresponding primary inductor; therefore, when a current flows out from the dotted terminal of the transformer secondary inductor, the current flows into the dotted terminal of the primary inductor in the group of inductors and then flows out from an undotted terminal of the primary inductor to a corresponding switch component. In addition, the current flows out from a dotted terminal of a secondary inductor corresponding to the group of inductors to a corresponding diode according to a current flow direction rule for a dotted terminal and an undotted terminal of a primary inductor and a secondary inductor of a current transformer. Therefore, the on-off state of a diode is synchronous with the on-off state of a corresponding switch component. Therefore, the controller 11 may directly control the on-off state of a corresponding switch component according to the on-off state of a diode, thereby achieving a purpose of precisely controlling the on-off state of the synchronous rectification circuit 200.

Further, the controller 11 includes a first comparing module 111, a second comparing module 112, a third comparing module 113, a fourth comparing module 114, a fifth comparing module 115, a sixth comparing module 116, and a control module 117. The first to the sixth comparing modules 111-116 respectively correspond to the first to the sixth diodes D1-D6. Two ends of the first to the sixth comparing modules 111-116 are respectively connected to a positive electrode and a negative electrode of a corresponding diode, and the first to the sixth comparing modules are configured to compare sampled voltages of the positive electrode and the negative electrode of the corresponding diode. An output end of the first to the sixth comparing modules 111-116 is connected to the control module 117, to output a comparison result to the control module 117. The control module 117 determines the on-off state of a corresponding diode according to the comparison result, to control the on-off state of a switch component corresponding to the corresponding diode.

When determining that a voltage of a positive electrode of a diode in the first to the sixth diodes D1-D6 is greater than a voltage of a negative electrode of the diode, the control module 117 controls a switch component corresponding to the connected diode to be switched on.

Further, the synchronous rectification converter circuit 100 further includes a filter capacitor C1, where the filter capacitor C1 is connected between the first end and the second end of the resistor R.

In this implementation manner, an end that is connected to a corresponding second node and of each secondary inductor has a same polarity as an end that is connected to a corresponding first node and of a corresponding transformer secondary inductor; therefore, when a current flows through the transformer secondary inductor and the secondary inductor, a direction at which the current flows out from the transformer secondary inductor to a corresponding switch component is the same as a direction at which the current flows out from the corresponding secondary inductor to a corresponding diode. Therefore, the on-off state of the diode is synchronous with the on-off state of the corresponding switch component. Therefore, the controller 11 can control the on-off state of a corresponding switch component according to the on-off state of a diode. The synchronous rectification converter circuit 100 achieves a purpose of precisely controlling the on-off state of the synchronous rectification circuit 200.

In addition, in the prior art, after being connected in series to form a triangular structure, transformer secondary inductors are connected to primary inductors of a current transformer, so that a current of a primary inductor of the current transformer is larger than a current of a transformer secondary inductor (about 1.732 times). Therefore, a copper sheet of a primary inductor of the current transformer needs to be relatively thick and wide. In this case, a volume of the current transformer is relatively large, so the current transformer occupies relatively large space of a resonant converter. However, in the present invention, transformer secondary inductors and primary inductors of a current transformer are alternately connected head-to-tail in series to form a first triangular structure. Therefore, a current of a primary inductor of the current transformer is equal to a current of a transformer secondary inductor. Therefore, in comparison with the prior art, a current of a primary inductor of a current transformer decreases, and a thickness and a width of a copper sheet of the primary inductor of the current transformer also decrease. In this case, a volume of the current transformer decreases, so the current transformer occupies less space of a resonant converter and save space of the resonant converter.

Figure 2:
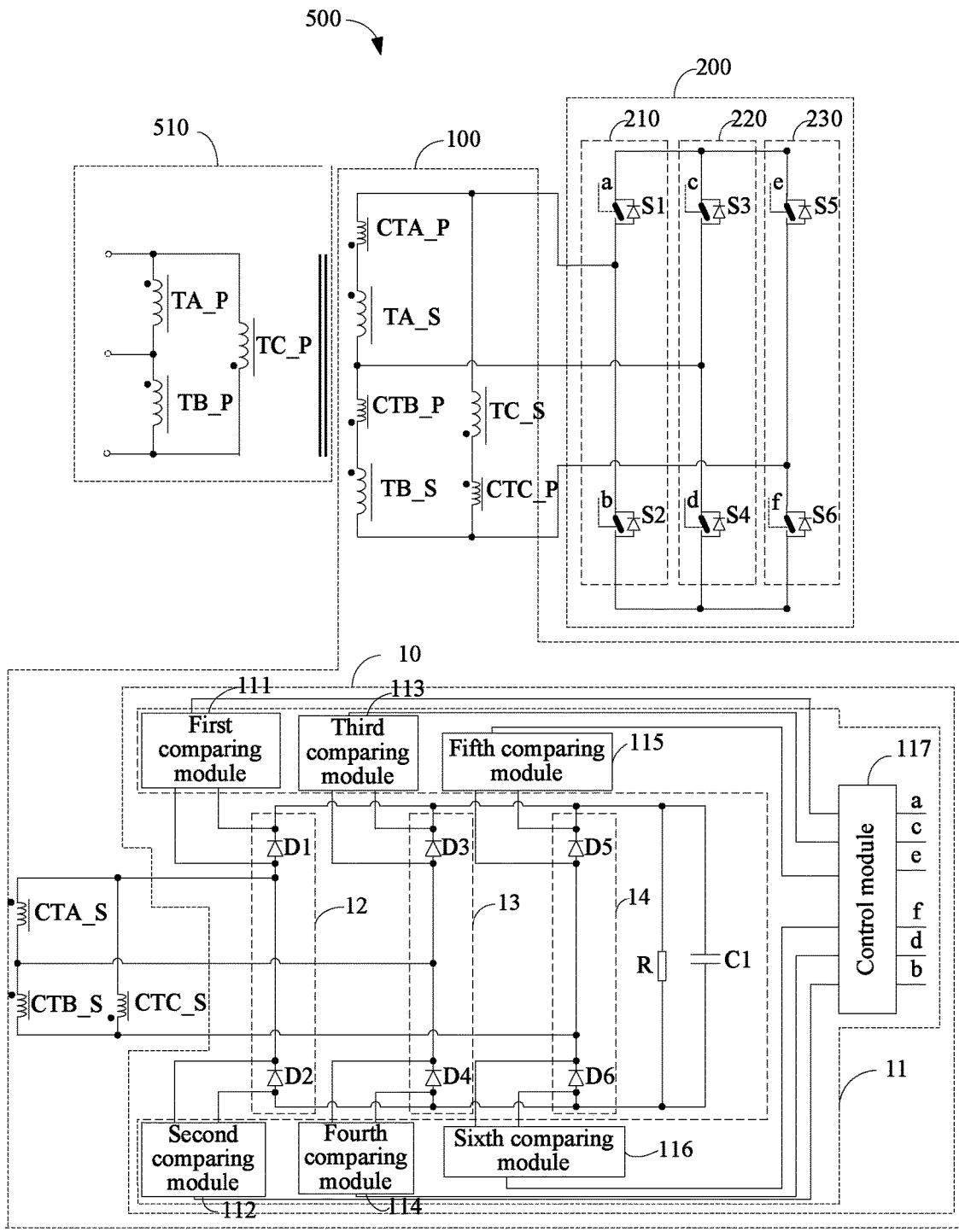
FIG. 2 is a circuit diagram of a synchronous rectification converter circuit connected to a synchronous rectification circuit according to another embodiment of a first solution of the present invention.

In this implementation manner, the synchronous rectification control circuit is applied to a three-phase resonant converter; therefore, in the synchronous rectification converter circuit, the number of the transformer secondary inductors is three, and a selected current transformer includes three primary inductors and three secondary inductors. In another implementation manner, the synchronous rectification converter circuit may also be applied to an N-phase resonant converter; the number of transformer secondary inductors is N; a current transformer including N primary inductors and N secondary inductors may also be selected; and a manner in which the N transformer secondary inductors are connected to the N primary inductors and the N secondary inductors is the same as a connection manner in the foregoing embodiment. Details are as follows:

Referring to FIG. 2, another embodiment of a first solution of the present invention provides a synchronous rectification converter circuit 300, which is applied to a resonant converter and configured to control a synchronous rectification circuit 400 in the resonant converter. The synchronous rectification circuit 400 includes a first to an $N^{th}$ groups S1-Sn of switch components. The first to the $N^{th}$ groups S1-Sn of switch components are connected in series. Each group of switch components includes two switch components and a first node between the two switch components.

The synchronous rectification converter circuit 300 includes a transformer secondary inductor group, a current transformer, and a control unit 310.

The transformer secondary inductor group includes a first to an $N^{th}$ transformer secondary inductors T1-S-Tn-S.

The current transformer includes a first to an $N^{th}$ primary inductors CT1-P-CTn-P and a first to an $N^{th}$ secondary inductors CT1-S-CTn-S. The first to the $N^{th}$ transformer secondary inductors T1-S-Tn-S and the first to the $N^{th}$ primary inductors CT1-P-CTn-P are sequentially and alternately connected head-to-tail in series to form a first structure having N angles. The first structure having N angles includes N edges and N third vertices. The first primary inductor CTA-P is connected in series to the first transformer secondary inductor TA-S on the first edge, the second primary inductor CTB-P is connected in series to the second transformer secondary inductor TB-S on the second edge, and the third primary inductor CTC-P is connected in series to the third transformer secondary inductor TC-S on the third edge. By analogy, the $N^{th}$ primary inductor CTn-P is connected in series to the $N^{th}$ transformer secondary inductor Tn-S on the $N^{th}$ edge. The N third vertices are respectively connected to the N first nodes in the first to the $N^{th}$ groups S1-Sn of switch components. The first to the $N^{th}$ secondary inductors CT1-S-CTn-S are sequentially connected head-to-tail in series to form a second structure having N angles. The second structure having N angles includes N edges and N fourth vertices. The first secondary inductor CTA-S is on the first edge, the second secondary inductor CTB-S is on the second edge, and the third secondary inductor CTC-S is on the third edge. By analogy, the $N^{th}$ secondary inductor CTn-S is on the $N^{th}$ edge.

The control unit 310 includes a controller 311, a first to an $N^{th}$ groups D1-Dn of diodes, and a resistor R. The first to the $N^{th}$ groups of diodes are connected in parallel at two ends of the resistor R; each group of diodes includes two diodes and a second node between the two diodes; and the two diodes in each group of diodes are connected in series. The N second nodes of the first to the $N^{th}$ groups D1-Dn of diodes are respectively connected to the N fourth vertices. In addition, an end that is connected to a corresponding second node and of the first to the $N^{th}$ secondary inductors CT1-S-CTn-S has a same polarity as an end that is connected to a corresponding first node and of the corresponding transformer secondary inductors T1-S-Tn-S. The controller 311 is connected to the switch components in the first to the $N^{th}$ groups S1-Sn of switch components. The controller 311 is further connected to each diode of the first to the $N^{th}$ groups D1-Dn of diodes, to sample voltages at two ends of the diode, acquire a sampling result, and control the on-off state of a corresponding switch component according to the sampling result.

Specifically, the controller 311 includes a control module 312 and a first to an $N^{th}$ groups of comparing modules. The first to the $N^{th}$ groups of comparing modules respectively correspond to the first to the $N^{th}$ groups D1-Dn of diodes. Each group of comparing modules includes two comparing modules. For example, the first group of comparing modules includes a first comparing module B11 and a second comparing module B12, the second group of comparing modules includes a third comparing module B21 and a fourth comparing module B22, and the third group of comparing modules includes a fifth comparing module B31 and a sixth comparing module B32. By analogy, the $N^{th}$ group of comparing modules is learned. That is, the $N^{th}$ group of comparing modules includes a $(2n-1)^{th}$ comparing module Bn1 and a $(2n)^{th}$ comparing module Bn2.

In this implementation manner, one comparing module corresponds to one diode. Two input ends of each comparing module are connected respectively to a positive electrode and a negative electrode of a corresponding diode, and the comparing module is configured to compare sampled voltages of the positive electrode and the negative electrode of the corresponding diode, and output a comparison result to the control module 312. The control module 312 determines the on-off state of the corresponding diode according to the comparison result, to control the on-off state of a switch component corresponding to the corresponding diode.

When the control module 312 determines that a voltage of a positive electrode of a diode in the first to the $N^{th}$ groups D1-Dn of diodes is larger than a voltage of the negative electrode of the diode, the control module 312 controls a switch component corresponding to the connected diode to be switched on.

It should be noted that, a transformer secondary inductor in each group of inductors is connected to a dotted terminal of a primary inductor in the group of inductors by using a dotted terminal of the transformer secondary inductor, and connection of two neighboring groups of inductors is implemented by connection between a transformer secondary inductor in one group of inductors and a primary inductor in the other group of inductors.

Further, the synchronous rectification converter circuit 300 further includes a filter capacitor C2, where the filter capacitor C2 is connected between a first end and a second end of the resistor R.

In this implementation manner, an end that is connected to a corresponding second node and of the first to the $N^{th}$ secondary inductors CT1-S-CTn-S has a same polarity as an end that is connected to a corresponding first node and of the corresponding transformer secondary inductors T1-S-Tn-S; therefore, when a current flows through the transformer secondary inductors and the secondary inductors, a direction at which the current flows out from a transformer secondary inductor to a corresponding switch component is the same as a direction at which the current flows out from a corresponding secondary inductor to a corresponding diode. Therefore, the on-off state of the diode is synchronous with the on-off state of the corresponding switch component. Therefore, the controller 311 can directly control the on-off state of the corresponding switch component according to the on-off state of the diode. The synchronous rectification converter circuit 300 achieves a purpose of precisely controlling the on-off state of the synchronous rectification circuit 400.

In addition, in the prior art, after being connected in series to form a structure having N angles, transformer secondary inductors are connected to primary inductors of a current transformer, so that a current of a primary inductor of the current transformer is larger than a current of a transformer secondary inductor (about 1.732 times). Therefore, a copper sheet of a primary inductor of the current transformer needs to be relatively thick and wide. In this case, a volume of the current transformer is relatively large, so the current transformer occupies relatively large space of a resonant converter. However, in the present invention, transformer secondary inductors and primary inductors of a current transformer are alternately connected head-to-tail in series to form a first structure having N angles. Therefore, a current of a primary inductor of the current transformer is equal to a current of a transformer secondary inductor. Therefore, in comparison with the prior art, a current of a primary inductor of a current transformer decreases, and a thickness and a width of a copper sheet of the primary inductor of the current transformer also decrease correspondingly. In this case, a volume of the current transformer decreases, so the current transformer occupies less space of a resonant converter and save space of the resonant converter.

Figure 3:
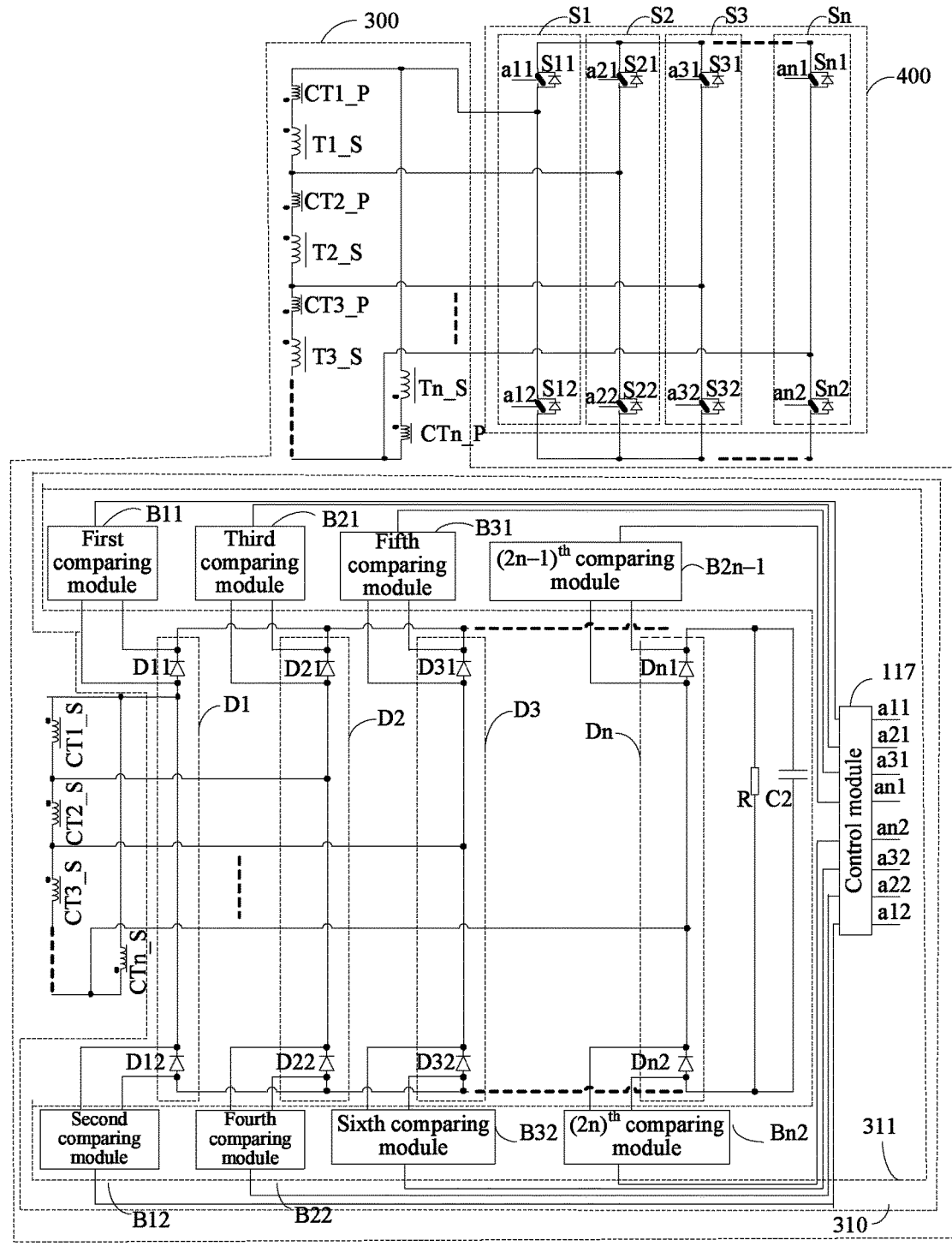
FIG. 3 is a circuit diagram of a resonant converter according to an embodiment of a second solution of the present invention.

Referring to FIG. 3, an embodiment of a second solution of the present invention provides a resonant converter 500. The resonant converter 500 includes a synchronous rectification circuit 200 and the synchronous rectification converter circuit 100 in the first exemplary implementation manner of the foregoing first solution. The synchronous rectification circuit 200 includes a first to a third groups 210-230 of switch components. The first to the third groups 210-230 of switch components are connected in parallel between two output ends of the resonant converter 500. Each group of switch components includes two switch components and a first node between the two switch components. The synchronous rectification converter circuit 100 is configured to control the synchronous rectification circuit 200. Both a specific structure of the synchronous rectification converter circuit 100 and a connection relationship between the synchronous rectification converter circuit 100 and the synchronous rectification circuit 200 are specifically described in the first exemplary implementation manner of the first solution; therefore, details are not described herein again.

Specifically, the first group 210 of switch components includes a first switch component S1 and a second switch component S2, the second group 220 of switch components includes a third switch component S3 and a fourth switch component S4, and the third group 230 of switch components includes a fifth switch component S5 and a sixth switch component S6. The first and the second switch components S1 and S2 are connected in series, the third and the fourth switch components S3 and S4 are connected in series, and the fifth and the sixth switch components S5 and S6 are connected in series.

Further, the resonant converter 500 further includes a resonant circuit 510. The resonant circuit 510 includes a transformer primary inductor group and a resonant element connected to the transformer primary inductor group. The transformer primary inductor group is configured to receive an alternating voltage signal, and transform and couple the alternating voltage signal into a transformer secondary inductor group.

The transformer primary inductor group includes a first transformer primary inductor TA-P, a second transformer primary inductor TB-P, and a third transformer primary inductor TC-P. The first to the third transformer primary inductors TA-P, TB-P, and TC-P are connected head-to-tail to form a third triangular structure. The third triangular structure includes three edges and three fifth vertices. The first transformer primary inductor TA-P is on the first edge, the second transformer primary inductor TB-P is on the second edge, and the third transformer primary inductor TC-P is on the third edge. The three fifth vertices are connected to the resonant element. The resonant element may include a resonant capacitor, a resonant inductor, and the like.

In this implementation manner, an end that is connected to a corresponding second node and of each secondary inductor has a same polarity as an end that is connected to a corresponding first node and of a corresponding transformer secondary inductor; therefore, when a current flows through the transformer secondary inductor and the secondary inductor, a direction at which the current flows out from the transformer secondary inductor to a corresponding switch component is the same as a direction at which the current flows out from the corresponding secondary inductor to a corresponding diode. Therefore, the on-off state of the diode is synchronous with the on-off state of the corresponding switch component. Therefore, the controller 11 can directly control the on-off state of a corresponding switch component according to the on-off state of a diode. The synchronous rectification converter circuit 100 achieves a purpose of precisely controlling the on-off state of the synchronous rectification circuit 200.

In addition, in the prior art, after being connected in series to form a triangular structure, transformer secondary inductors are connected to primary inductors of a current transformer, so that a current of a primary inductor of the current transformer is larger than a current of a transformer secondary inductor (about 1.732 times). Therefore, a copper sheet of a primary inductor of the current transformer needs to be relatively thick and wide. In this case, a volume of the current transformer is relatively large, so the current transformer occupies relatively large space of a resonant converter. However, in the present invention, transformer secondary inductors and primary inductors of a current transformer are alternately connected head-to-tail in series to form a first triangular structure. Therefore, a current of a primary inductor of the current transformer is equal to a current of a transformer secondary inductor. Therefore, in comparison with the prior art, a current of a primary inductor of a current transformer decreases, and a thickness and a width of a copper sheet of the primary inductor of the current transformer also decrease. In this case, a volume of the current transformer decreases, so the current transformer occupies less space of a resonant converter 500 and save space of the resonant converter 500.

Figure 4:
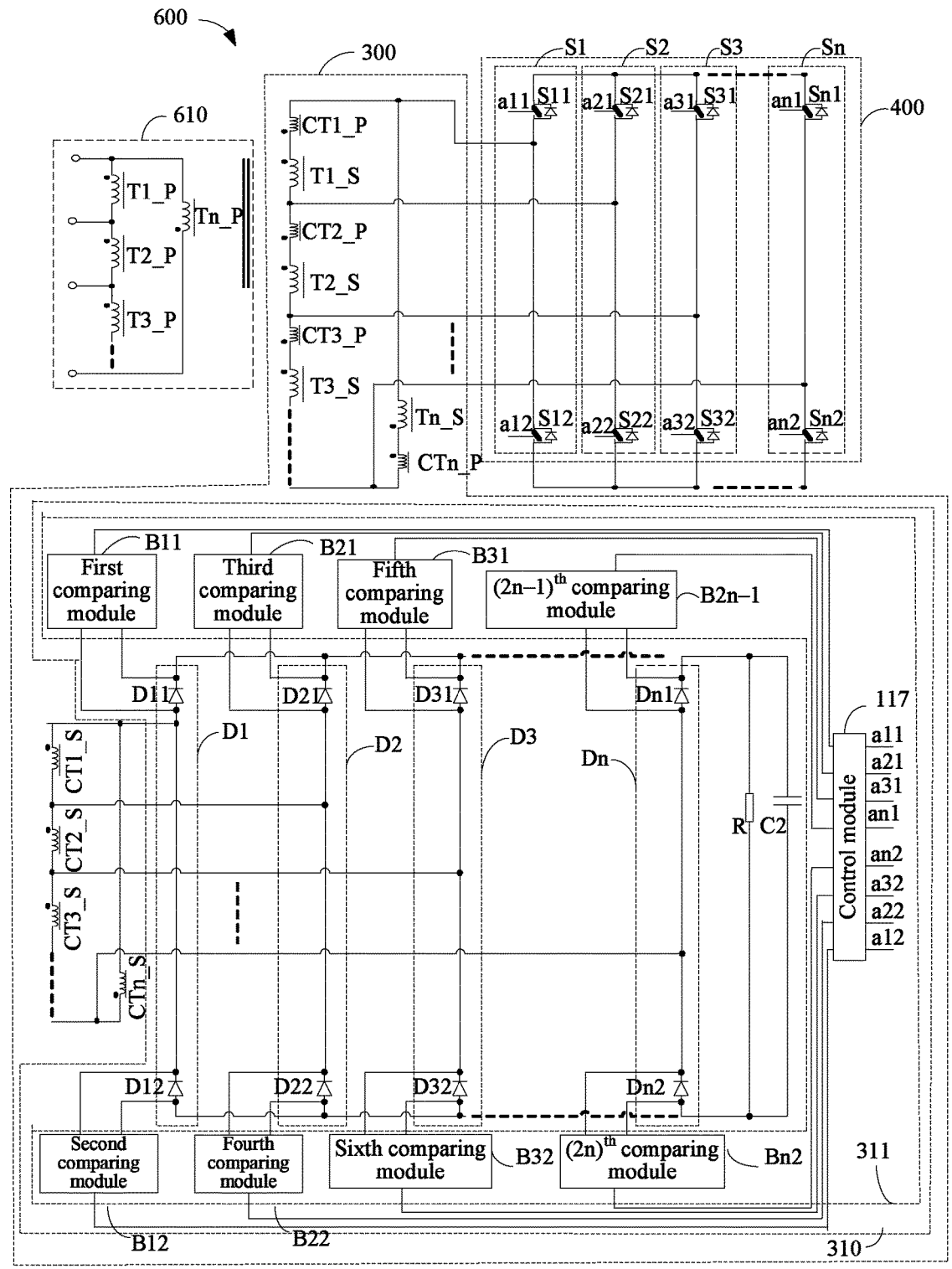
FIG. 4 is a circuit diagram of a resonant converter according to another embodiment of a second solution of the present invention.

Referring to FIG. 4, another embodiment of a second solution of the present invention provides a resonant converter 600. The resonant converter 600 includes a synchronous rectification circuit 400 and the synchronous rectification converter circuit 300 in the second exemplary implementation manner of the foregoing first solution. The synchronous rectification circuit 400 includes a first to an $N^{th}$ groups S1-Sn of switch components. The first to the $N^{th}$ groups S1-Sn of switch components are connected in parallel between two output ends of the resonant converter 600. Each group of switch components includes two switch components and a first node between the two switch components. The synchronous rectification converter circuit 300 is configured to control the on-off state of the synchronous rectification circuit 400. Both a specific structure of the synchronous rectification converter circuit 300 and a connection relationship between the synchronous rectification converter circuit 300 and the synchronous rectification circuit 400 are specifically described in the second exemplary implementation manner of the first solution; therefore, details are not described herein again.

Further, the resonant converter 600 further includes a resonant circuit 610. The resonant circuit 610 includes a transformer primary inductor group and a resonant element connected to the transformer primary inductor group. The transformer primary inductor group is configured to receive an alternating voltage signal, and transform and couple the alternating voltage signal into a transformer secondary inductor group.

The transformer primary inductor group includes a first to an $N^{th}$ transformer primary inductors T1-P-TN-P. The first to the $N^{th}$ transformer primary inductors T1-P-TN-P are connected head-to-tail in series to form a third structure having N angles. The third structure having N angles includes N edges and N sixth vertices. The first transformer primary inductor T1-P is on the first edge, the second transformer primary inductor T2-P is on the second edge, and the third transformer primary inductor T3-P is on the third edge. By analogy, the $N^{th}$ transformer primary inductor TN-P is on the $N^{th}$ edge. The N sixth vertices are connected to the corresponding resonant element. The resonant element may include a resonant capacitor, a resonant inductor, and the like.

In this implementation manner, an end that is connected to a corresponding second node and of a first to an $N^{th}$ secondary inductors CT1-S-CTn-S has a same polarity as an end that is connected to a corresponding first node and of corresponding transformer secondary inductors T1-S-Tn-S; therefore, when a current flows through the transformer secondary inductors and the secondary inductors, a direction at which the current flows out from a transformer secondary inductor to a corresponding switch component is the same as a direction at which the current flows out from a corresponding secondary inductor to a corresponding diode. Therefore, the on-off state of the diode is synchronous with the on-off state of the corresponding switch component. Therefore, a controller 311 can control the on-off state of the corresponding switch component according to the on-off state of the diode. The synchronous rectification converter circuit 300 achieves a purpose of precisely controlling the on-off state of the synchronous rectification circuit 400.

In addition, in the prior art, after being connected in series to form a structure having N angles, transformer secondary inductors are connected to primary inductors of a current transformer, so that a current of a primary inductor of the current transformer is larger than a current of a transformer secondary inductor (about 1.732 times). Therefore, a copper sheet of a primary inductor of the current transformer needs to be relatively thick and wide. In this case, a volume of the current transformer is relatively large, so the current transformer occupies relatively large space of a resonant converter. However, in the present invention, transformer secondary inductors and primary inductors of a current transformer are alternately connected head-to-tail in series to form a first structure having N angles. Therefore, a current of a primary inductor of the current transformer is equal to a current of a transformer secondary inductor. Therefore, in comparison with the prior art, a current of a primary inductor of a current transformer decreases, and a thickness and a width of a copper sheet of the primary inductor of the current transformer also decrease correspondingly. In this case, a volume of the current transformer decreases, so the current transformer occupies less space of a resonant converter 600 and save space of the resonant converter 600.

What is disclosed above is merely an embodiment of the present invention, and certainly is not intended to limit the protection scope of the present invention. A person of ordinary skill in the art may understand that all or some of procedures that implement the foregoing embodiments and equivalent modifications made in accordance with the claims of the present invention shall fall within the scope of the present invention.

What is claimed is:

1. A synchronous rectification converter circuit, comprising:
   a first triangle structure circuit comprising three branches, with each branch comprising a transformer secondary-side winding and a current transformer primary-side winding, wherein the transformer secondary-side winding and the current transformer primary-side winding are connected in series;
   a second triangle structure circuit comprising three branches; with each branch comprising a current transformer secondary-side winding;
   a synchronous rectification switching circuit including a first node, a second node and a third node, wherein the three vertices of the first triangle structure circuit are respectively connected to the first node, the second node and the third node of the synchronous rectification switching circuit;
   a diode rectification circuit including a fourth node, a fifth node and a sixth node; wherein the three vertices of the second triangle structure circuit are respectively connected to the fourth node, the fifth node and the sixth node; and
   a control circuit including a diode voltage sampling circuit and a controller, wherein the diode rectification circuit is connected to the diode voltage sampling circuit, wherein the diode voltage sampling circuit is connected to the controller, and wherein the controller is connected to the synchronous rectification switching circuit;

wherein the diode voltage sampling circuit of the control circuit detects voltage of a diode included in the diode rectification circuit to acquire a diode voltage value and sends the diode voltage value to the controller; and the controller determines whether a current flows through a switching transistor in the synchronous rectification switch circuit, which is corresponding to the diode included in the diode rectification circuit; wherein when a current flows through the switching transistor, the controller sends a control signal to the switching transistor to make the switching transistor open.

2. The synchronous rectification converter circuit according to claim 1, the control circuit also includes a resistance;

the diode rectification circuit includes a first to third groups of diodes;

the first to third groups of diodes are connected in parallel with the ends of the resistance;

the first group of diodes includes two diodes and a fourth node between the two diodes; the two diodes of the first group diodes are connected in series;

the second group of diodes includes two diodes and a fifth node between the two diodes; the two diodes of the second group diodes are connected in series;

the third group of diodes includes two diodes and a sixth node between the two diodes; the two diodes of the third group diodes are connected in series.

3. The synchronous rectification converter circuit according to claim 2, wherein:

a dotted terminal of the transformer secondary-side winding is connected to a dotted terminal of the current transformer primary-side winding, an undotted terminal of the transformer secondary-side winding is connected to an undotted terminal of a current transformer primary-side winding of another branch.

4. The synchronous rectification converter circuit according to claim 2, wherein the first group of diodes comprises a first diode and a second diode; the second group of diodes comprises a third diode and a fourth diode; the third group of diodes comprises a fifth diode and a sixth diode; a positive electrode of the first diode is connected to a negative electrode of the second diode; the positive electrode of the first diode is further connected to the dotted terminal of the first current transformer secondary-side winding; a negative electrode of the first diode is connected to a first end of the resistor; a positive electrode of the second diode is connected to a second end of the resistor; a positive electrode of the third diode is connected to a negative electrode of the fourth diode; the positive electrode of the third diode is further connected to the dotted terminal of the second current transformer secondary-side winding; a negative electrode of the third diode is connected to the first end of the resistor; a positive electrode of the fourth diode is connected to the second end of the resistor; a positive electrode of the fifth diode is connected to a negative electrode of the sixth diode; the positive electrode of the fifth diode is further connected to the dotted terminal of the third current transformer secondary-side winding; a negative electrode of the fifth diode is connected to the first end of the resistor; and a positive electrode of the sixth diode is connected to the second end of the resistor.

5. The synchronous rectification converter circuit according to claim 4, wherein the controller comprises a control circuit and a first to a sixth comparing circuits; the first to the sixth comparing circuits respectively correspond to the first to the sixth diodes; two input ends of the first to the sixth comparing circuits are respectively connected to a positive electrode and a negative electrode of a corresponding diode, and the first to the sixth comparing circuits are configured to compare sampled voltages of the positive electrode and the negative electrode of the corresponding diode; an output end of the first to the sixth comparing circuits is connected to the control circuit, to output a comparison result to the control circuit; and the control circuit is connected to each switch component in the first to the third groups of switch components and determines the on-off state of the corresponding diode according to the comparison result, to control the on-off state of switch components corresponding to the corresponding diode.

6. The synchronous rectification converter circuit according to claim 2, wherein the synchronous rectification converter circuit further comprises a filter capacitor connected between the first end and the second end of the resistor.

7. A resonant converter, comprising:

a synchronous rectification circuit comprising a first triangle structure circuit, a second triangle structure circuit, a synchronous rectification switching circuit, a diode rectification circuit and control circuit; and a synchronous rectification converter circuit that is configured to control the synchronous rectification circuit, wherein the first triangle structure circuit comprises three branches; each branch comprises a transformer secondary-side winding and a current transformer primary-side winding; wherein the transformer secondary-side winding and the current transformer primary-side winding are connected in series;

wherein the second triangle structure circuit comprises three branches; each branch comprises a current transformer secondary-side winding;

the synchronous rectification switching circuit includes a first node, a second node and a third node; the three vertices of the first triangle structure circuit are respectively connected to the first node, the second node and the third node;

the diode rectification circuit includes a fourth node, a fifth node and a sixth node; the three vertices of the second triangle structure are respectively connected to the fourth node, the fifth node and the sixth node;

the control circuit includes a diode voltage sampling circuit and a controller; the diode rectification circuit is connected to the diode voltage sampling circuit; the diode voltage sampling circuit is connected to the controller; the controller is connected to the synchronous rectification switching circuit;

the diode voltage sampling circuit detects voltage of a diode included in the diode rectification circuit to acquire a diode voltage and sends the diode voltage value to the controller;

the controller determines whether a current flows through a switching transistor in the synchronous rectification switch circuit, which is corresponding to the diode included in the diode rectification circuit; wherein when a current flows through the switching transistor, the controller sends a control signal to the switching transistor to make the switching transistor open.

8. The resonant converter according to claim 7, the control circuit also includes a resistance;

the diode rectification circuit includes a first to third groups of diodes;

the first to third groups of diodes are connected in parallel with the ends of the resistance;

the first group of diodes includes two diodes and a fourth node between the two diodes; wherein the two diodes of the first group of diodes are connected in series;

the second group of diodes includes two diodes and a fifth node between the two diodes; wherein the two diodes of the second group of diodes are connected in series;

the third group of diodes includes two diodes and a sixth node between the two diodes; wherein the two diodes of the third group of diodes are connected in series.

9. The resonant converter according to claim 8, wherein: a dotted terminal of the transformer secondary-side winding is connected to a dotted terminal of the current transformer primary-side winding, an undotted terminal of the transformer secondary-side winding is connected to an undotted terminal of a current transformer primary-side winding of another branch.

10. The resonant converter according to claim 8, wherein the first group of diodes comprises a first diode and a second diode; the second group of diodes comprises a third diode and a fourth diode; the third group of diodes comprises a fifth diode and a sixth diode; a positive electrode of the first diode is connected to a negative electrode of the second diode; the positive electrode of the first diode is further connected to the dotted terminal of the first current transformer secondary-side winding; a negative electrode of the first diode is connected to a first end of the resistor; a positive electrode of the second diode is connected to a second end of the resistor; a positive electrode of the third diode is connected to a negative electrode of the fourth diode; the positive electrode of the third diode is further connected to the dotted terminal of the second current transformer secondary-side winding; a negative electrode of the third diode is connected to the first end of the resistor; a positive electrode of the fourth diode is connected to the second end of the resistor; a positive electrode of the fifth diode is connected to a negative electrode of the sixth diode; the positive electrode of the fifth diode is further connected to the dotted terminal of the third current transformer secondary-side winding; a negative electrode of the fifth diode is connected to the first end of the resistor; and a positive electrode of the sixth diode is connected to the second end of the resistor.

11. The resonant converter according to claim 10, wherein the controller comprises a control circuit and a first to a sixth comparing circuits; the first to the sixth comparing circuits respectively correspond to the first to the sixth diodes; two input ends of the first to the sixth comparing circuits are respectively connected to a positive electrode and a negative electrode of a corresponding diode, and the first to the sixth comparing circuits are configured to compare sampled voltages of the positive electrode and the negative electrode of the corresponding diode; an output end of the first to the sixth comparing circuits is connected to the control circuit, to output a comparison result to the control circuit; and the control circuit is connected to each switch component in the first to the third groups of switch components and determines the on-off state of the corresponding diode according to the comparison result, to control the on-off state of switch components corresponding to the corresponding diode.

12. The resonant converter according to claim 8, wherein the synchronous rectification converter circuit further comprises a filter capacitor, and the filter capacitor is connected between the first end and the second end of the resistor.

13. The resonant converter according to claim 7, wherein the resonant converter further comprises a resonant circuit; the resonant circuit comprises a transformer primary-winding group and a resonant element connected to the transformer primary-winding group; the transformer primary-winding group is configured to receive an alternating voltage signal, and transform and couple the alternating voltage signal into the transformer secondary-winding group, wherein the transformer primary-winding group comprises a first transformer primary-side winding, a second transformer primary-side winding and a third transformer primary-side winding, and the first to the third transformer primary-windings are connected head-to-tail to form a third triangular structure circuit, to connect to the resonant element, wherein the third triangular structure circuit comprises three edges and three third vertices; the first transformer primary-winding is on the first edge; the second transformer primary-winding is on the second edge; the third transformer primary-winding is on the third edge; and the three third vertices are connected to the resonant element.

* * * * *